Aug. 20, 1935.    H. W. RICHMOND ET AL    2,011,730
GRATING
Filed June 29, 1932    4 Sheets-Sheet 1
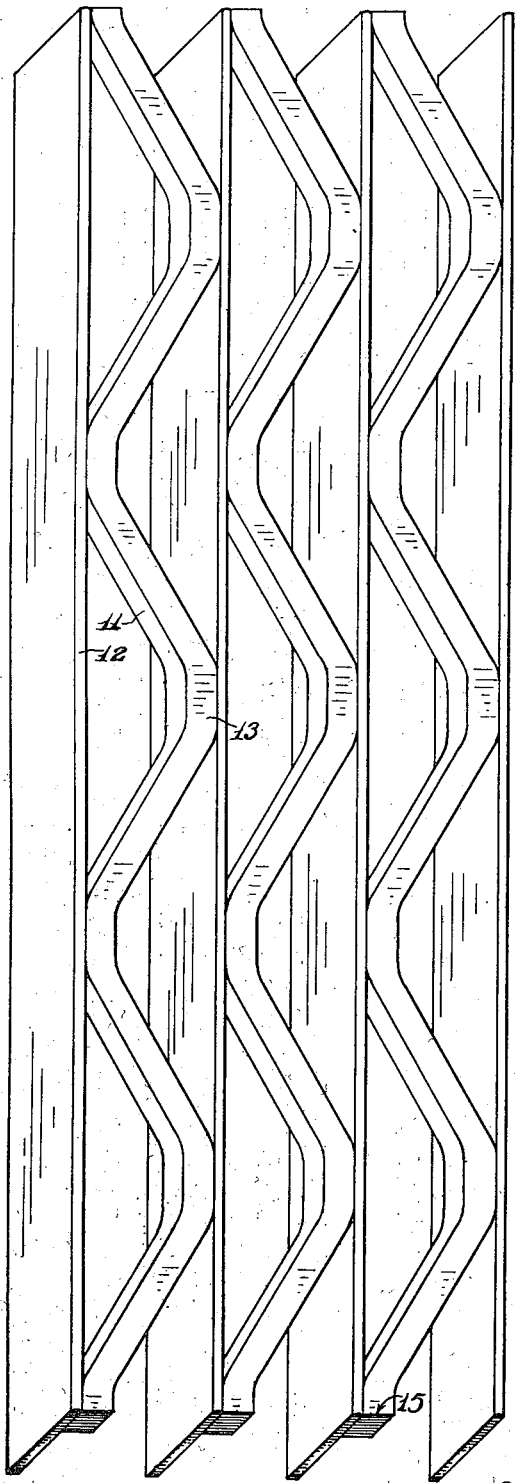
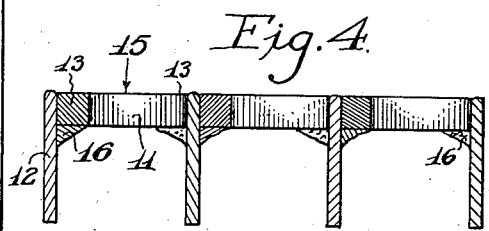
Fig. 4.
Fig. 1.
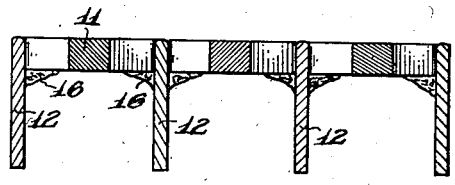
Fig. 5.
Inventors
HIRAM W. RICHMOND
CHARLES G. KEMP.
By Leonard L. Kalish
Attorney

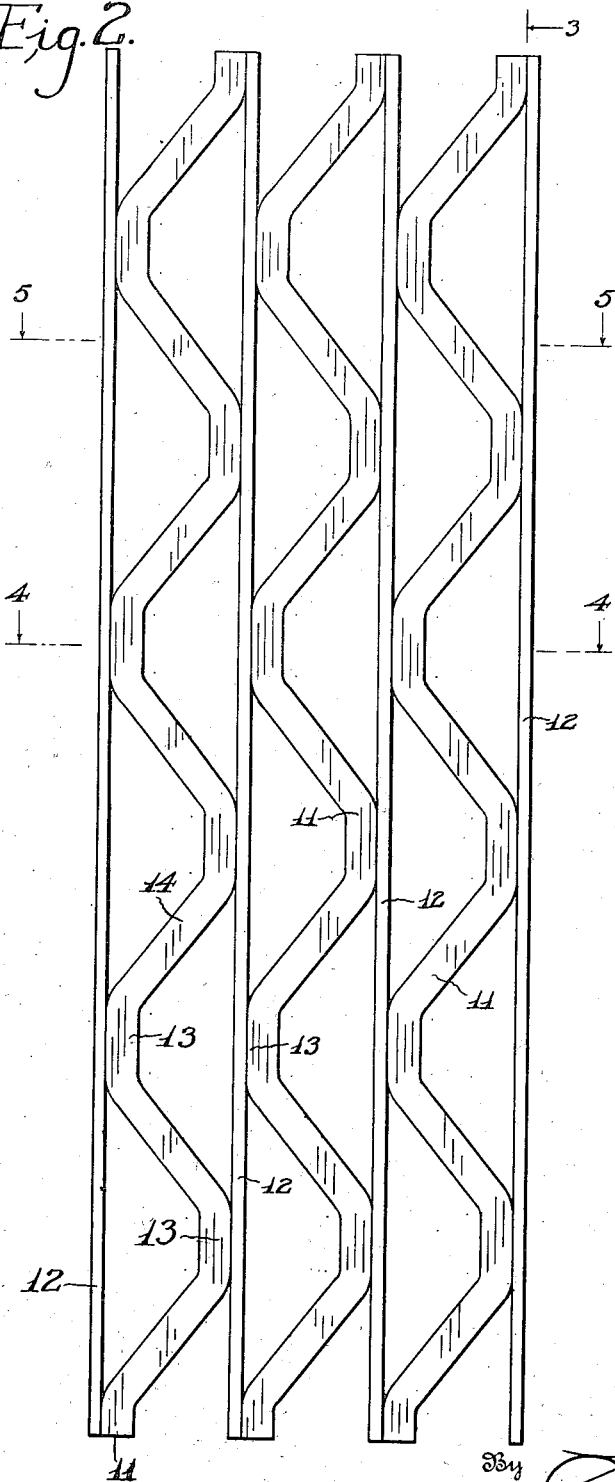
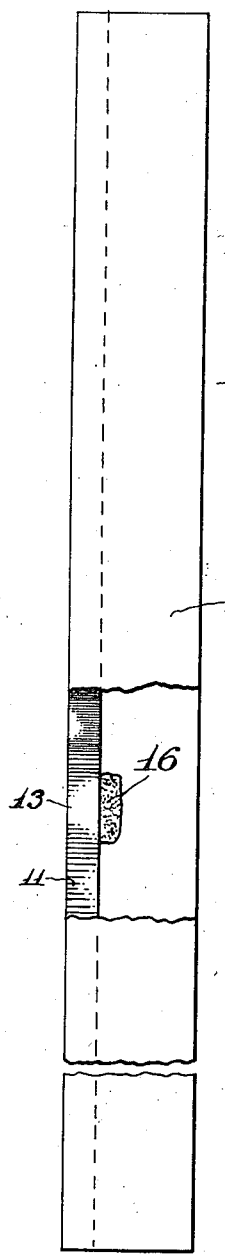

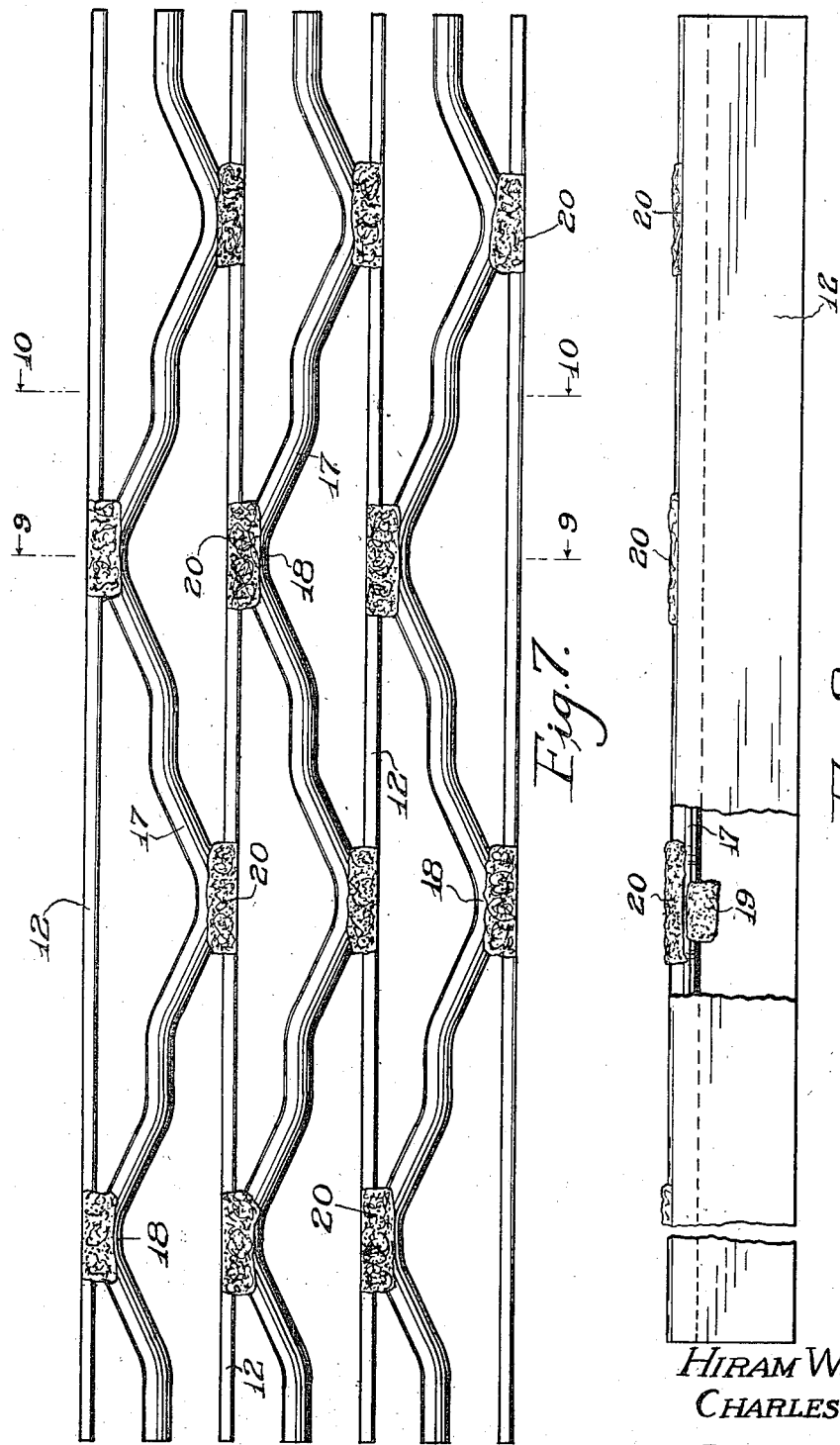

Patented Aug. 20, 1935

2,011,730

UNITED STATES PATENT OFFICE 2,011,730

GRATING

Hiram W. Richmond and Charles G. Kemp, Philadelphia, Pa.

Application June 29, 1932, Serial No. 619,974

1 Claim. (Cl. 94—30)

Our invention relates to certain new and useful improvements in grating and the method of making the same, and it relates more particularly to grating intended to carry substantial loads, as for instance, in street construction and also in industrial plant construction.

One of the objects of our invention is to provide a grating which will possess a maximum degree of strength and durability and will have a minimum weight for any given size and strength. A further object of our invention is to provide a grating of superior tread and of more universal adaptability.

With the above and other objects in view which will appear more fully from the following detailed description, our invention consists of an integral grating comprising a multiplicity of generally parallel beam members, being of relatively small transverse dimension horizontally and being of relatively great transverse dimension vertically (or in the direction of the load), and a multiplicity of connector or brace members, the transverse dimensions of which horizontally are substantially greater than the corresponding dimensions of said beam members and the vertical transverse dimensions of which are substantially less than the vertical transverse dimensions of said beam members;—said connector or brace members extending between each pair of beam members in a generally corrugated fashion flush with the upper edges of said beam members and being permanently and integrally united with said beam member by additional metal applied to the junctures of said beam members and brace members in the molten or fused state.

Our invention further consists of other novel features of construction and method which will appear more fully from the following detailed description.

For the purpose of illustrating our invention, we have shown in the accompanying drawings forms thereof which are at present preferred by us, since the same have been found in practice to give satisfactory and reliable results, although it is to be understood that the various instrumentalities of which our invention consists can be variously arranged and organized and that our invention is not limited to the precise arrangement and organization of the instrumentalities as herein shown and described.

Referring to the drawings in which like reference characters indicate like parts:

Figure 1 represents a perspective view of a fragmentary portion of a grating embodying our invention.

Figure 2 represents a top plan view of the same.

Figure 3 represents a side elevational view of the same.

Figure 4 represents a section on line 4—4 of Figure 2.

Figure 5 represents a section on line 5—5 of Figure 2.

Figure 7 represents a top plan view of the modification shown in Figure 6.

Figure 8 represents a side elevational view of the modification shown in Figure 6.

Figure 6:
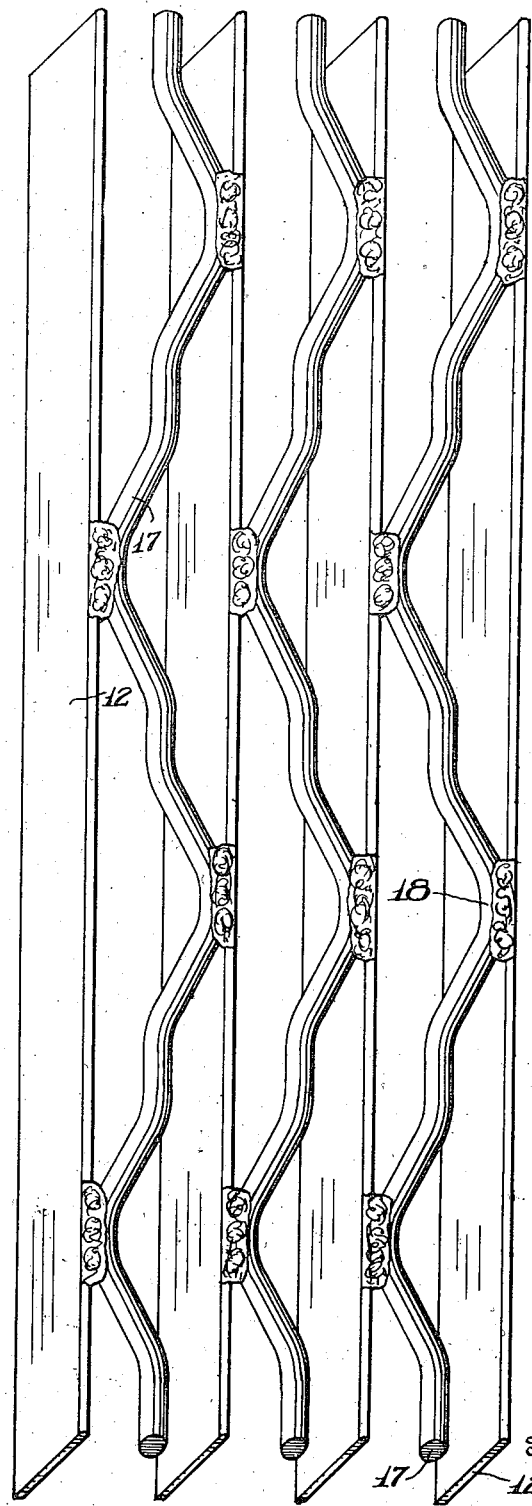
Figure 6 represents a perspective view of a fragmentary portion of grating illustrating another embodiment of our invention.
Figure 9:
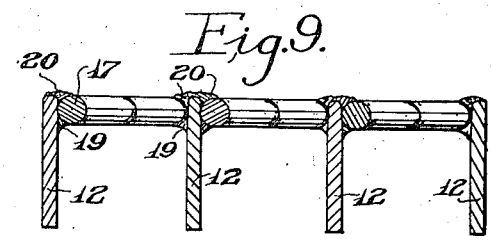
Figure 9 represents a section on line 9—9 of Figure 7.
Figure 10:
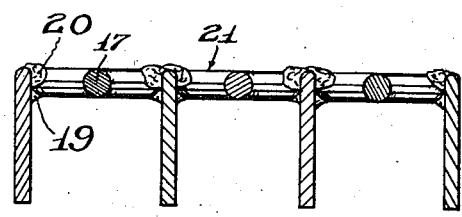
Figure 10 represents a section on line 10—10 of Figure 7.

In carrying out our invention, we first corrugate or shape brace members 11 to any suitable and generally universal contour, having an overall transverse width equal to the distance desired between adjacent parallel spaced beam members 12. In the modification shown in Figures 1 to 5 inclusive, the brace members 11 are of generally square cross-section, being in this modification a quarter of an inch on each side. These brace members are then formed as shown particularly in Figure 2, to provide the alternate and staggered parallel junction portions 13, which are generally straight and parallel to the beam members 12, and to provide the connector portions 14, at any suitable angle, depending on the frequency of junctures desired, and depending upon the spacing desired between adjacent beam members 12.

The brace member 11 may be so formed that at least the upper flat surfaces 15 of said brace members will remain in a single plane.

The beam members 12 are relatively thin flat bands of wrought iron, steel or the like, and are arranged with their maximum transverse dimension vertically, or in the direction of the load intended to be carried by the grating. In the particular modification shown in the drawings, the beam members are an eighth of an inch thick and an inch and a quarter deep.

The grating is then formed by positioning the beam members 12 and the brace members 11 in juxtaposition to each other, particularly as shown in Figures 1 and 2, and molten or fused wrought iron or steel from any suitable source, as for instance, suitable welding rods, is then applied to the juncture between the portions 13 of the brace members 11 and the beam members 12. In the modification shown in Figures 1 to 5 inclusive, this fused material is applied on the under side of the connector members 11 in the form of a fillet as indicated particularly in Figures 3, 4 and 5;—said molten or fused metal 16 being applied under the influence of the heat of an electric arc or under the influence of the heat of a suitably intense flame, such as oxy-acetylene or oxy-hydrogen flame, so that the added metal is integrally fused to both the beam members as well as the connector or brace members 11 and 12 respectively.

In the modification of our invention shown in Figures 6 to 10 inclusive, the connector or brace members 17 are round in cross section and also in the particular modification shown, are of a quarter-inch diameter. In this modification of our invention, the connector or brace members 17 are also corrugated between the adjacent beam members 12, and are provided with generally rounded or curved contact or juncture portions 18 in alternate and staggered relation as shown in Figures 6 and 7. In this modification of our invention, the molten or fused metal fillets 19 and 20 are preferably applied both beneath as well as above the brace members 17, at the junctions with the beam members, as shown particularly in Figures 8, 9 and 10, and the upper metal pads 20 are permitted to project slightly above the upper plane or effective surface 21 of the grating, with a somewhat rough surface formation, thereby to form an anti-slip tread over the upper surface of the grating.

By our novel method and construction, a substantially integral grating is produced, wherein the beam members which carry the direct load on the grating, are members of uniform and uninterrupted cross-section, that is, not interrupted by any recesses, apertures or other deformations as might tend to weaken the beam members at certain points at intervals, while the connector or brace members are integrally united to the beam members by additional metal fuses to both the beam members as well as the brace members in a molten condition. It would also be observed that in the grating of our present invention, the beam members or the main load members have relatively small dimensions transversely of the main load, and relatively great dimensions in the direction of the load;—while the transverse brace members have a great dimension transversely of the load, and a much lesser dimension in the direction of the load. By this means, made possible by our novel method and construction, the weight of the grating for any given span or area and load may be reduced to a minimum with a corresponding saving of metal, because the effective load capacity of the beam members is that of their real cross-section, as they are not weakened by any deformations, cut-outs, recesses, apertures or the like, and because the transverse bracing is applied and effected by an integral union with the beam members, likewise without any deformation, recessing or aperturing of the brace members, such as would tend to weaken the brace members at intervals.

It will also be observed that in our novel method and construction, the brace or connector members do not at any time cross any of the beam members, but each brace or connector member extends continuously between two parallel spaced beam members without crossing either one, but merely extending back and forth between the two beam members.

We are aware that our invention may be embodied in other specific forms without departing from the spirit or essential attributes thereof, and we therefore desire the present embodiments to be considered in all respects as illustrative and not restrictive, reference being had to the appended claim rather than to the foregoing description to indicate the scope of the invention.

Having thus described our invention, what we hereby claim as new and desire to secure by Letters Patent, is:

Grating comprising a multiplicity of parallel and spaced metallic beam members disposed in alignment with each other and having a relatively great transverse dimension in line with the load to be carried by the grating, and having a relatively small transverse dimension in a direction transversely of the load intended to be carried by the grating, a generally corrugated metallic brace member disposed between each pair of adjacent beam members having opposite juncture portions in operative juxtaposition to the pair of beam members on either side of said brace members;—the dimensions of said brace members in line with the load being substantially less than the corresponding dimensions of the beam members and the dimensions of said brace members in a direction transversely of the load being substantially greater than the corresponding dimensions of said beam members, and said brace members having their upper surfaces generally flush with the upper edges of said beam members, and elongated metallic fillets of added metal, at each juncture of the beam members and brace members, integrally fused to the generally transverse and intersecting upright surfaces of the beam members and the bottom surfaces of the brace members, and extending longitudinally of said beam members for a substantial distance; said beam members being devoid of weakened zones where union is made with the brace members.

HIRAM W. RICHMOND.
CHARLES G. KEMP.